Patented June 3, 1930

1,761,318

UNITED STATES PATENT OFFICE

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK

FRICTION BRAKE

No Drawing.   Application filed August 26, 1927. Serial No. 215,767.

This invention relates to friction brakes and the art of braking and its primary object is to provide a novel composition braking element comprising a carbonaceous material and to cause this material to produce in a novel manner under the heat of braking pressure the friction material which will provide a desired efficient braking effect.

Another object of the invention is to provide a novel composition brake block of ample strength to resist the pressures to which it may be subjected in service and which will not be structurally affected by the heat of friction except at the contact surface, which can be readily applied and replaced as required, which will give long service, and which will maintain its integrity and efficiency and will not break down or disintegrate or fail in its frictional properties as friction heat accumulates therein.

And a further object of the invention is to provide a new braking method wherein the friction element of a carbonaceous material is produced in a novel manner under braking pressure at the braking contact surface of a composition brake block as and to the extent which may be necessary to satisfy different braking requirements.

My invention contemplates a mixture of asbestos and a carbonaceous material in a suitable form with a binder and in proportions which may be varied to secure desired results as hereinafter indicated.

I use fibrous asbestos because it bonds the mass together and is heat resistant. I recommend the use of short fiber asbestos for reasons of economy and because I have found it satisfactory for the purpose.

For the carbonaceous material I now prefer to use a coking coal, which will melt under heat, which will give up condensable gases to produce tarry or pitchy elements under continued heat, and which can be readily prepared in a satisfactory form and combined with the asbestos in a manner which I regard as best suited for making a composition friction block in accordance with my invention.

I use a binder which has the property of enabling the composition to be reduced to a solid form, and for this purpose I prefer to use an oxidizing or drying oil.

The invention may be practiced by providing short fiber asbestos, a carbonaceous material such as bituminous coal reduced to a finely divided condition, and double boiled linseed oil. I have used coal which will pass through a 20 mesh screen and finer coal with satisfactory results. The asbestos and coal and linseed oil are mixed in a suitable mixer. The mixture is placed in a mold and is subjected to a sufficient pressure, say 2,000 lbs. or more per square inch to form a solid block, and the block is then placed in a drying oven and suitably cured. I consider it important that the carbonaceous material be in a finely divided condition and that it be distributed with a fair degree of uniformity throughout the mixture so that the wearing face of the block will be a composite of asbestos and carbonaceous material with the carbonaceous material distributed in a finely divided condition throughout the wearing surface at all times during the life of the block. An example of a composition which may be used, and one which I have found satisfactory, is as follows: equal parts of asbestos and bituminous coal, and ten percent by weight of linseed oil. The proportions of the asbestos and bituminous coal may be varied to meet different requirements as to friction and durability. I have claimed the composition in my divisional application Serial No. 255,497, filed February 18, 1928.

When the brake block is pressed under braking pressure against a member to be braked, such as a drum, the air is excluded from the braking contact surface and the coal at the surface will become plastic at a temperature of approximately 540° to 720° F., which temperature is quickly reached in a friction brake. This plastic condition is sufficient for some braking. As the friction heat increases decomposition gases are produced and the coal mass at the surface becomes substantially rigid. These gases are converted into a tarry or pitchy material which produces the desired condition for a higher degree of friction as required. This plastic zone consists of coal in the process of melting with tarry or pitchy material that is being distilled, and the thickness and nature of the zone depends upon the kind of coal used, the degree of fineness and the rate of temperature increase. The plastic zone is of very slight depth under all conditions, it travels inward of the block slowly and it forms, in effect, a shield which prevents the gases from penetrating the block and forces them to be expelled at the surface in contact with the member to be braked and also tends to protect the coal beneath the plastic zone against the heat of friction. As the friction heat increases, or as the braking contact surface of the block wears away, the plastic zone travels inward of the block but, as before stated, the rate of travel is slow, and the friction wear of the block under any ordinary brake application can hardly be detected. The gases and vapors are liberated on the drum side, which is the hot side, of the plastic zone and the tarry material into which they are converted forms a thin film coating on the braking surfaces and a most efficient braking element.

While I have referred to a coking coal as an example of a material which can be satisfactorily employed in my invention, I do not restrict myself thereto, but desire to use any carbonaceous or pyrobituminous material suitable for the purpose. A carbonaceous material, especially in a finely divided condition, has been found to be highly desirable as a frictional material because it contains the elements which are capable of producing a high degree of friction resistance, and because these elements are present in the carbonacous material in a condition ready to be converted by the heat of friction to produce the friction resistance in the degree and as required for effective braking. The particles of carbonaceous material are distributed as uniformly as possible in the mixing operation throughout the body of the block and they are supported and bonded together by the asbestos, as well as by the binder.

I believe it is broadly new to provide that the heat of friction shall produce a plastic zone and a film coating in the manner and to the extent and as required on the wearing face of a brake block to furnish braking friction of a high degree of efficiency, and also to constitute a barrier which will prevent the heat of friction from attacking the block beneath the zone. The friction elements are constantly being renewed by the heat and pressure to the extent and when required for producing the necessary friction. The block is preserved against disintegration in service because it is not subjected to the destructive heat of friction except at the wearing surface, there is little storage of heat in the body of the block, and the braking surface becomes rigid when cooled.

I claim:

1. A friction block for brakes consisting of a solid compressed mixture of a natural pyrobituminous material, asbestos, and a binder, the pyrobituminous material being finely divided and substantially uniformly distributed throughout the wearing portion of the block.

2. A friction block for brakes consisting of a solid compressed mixture of coal, asbestos, and a binder, the coal being finely divided and substantially uniformly distributed throughout the wearing portion of the block.

3. A friction block for brakes consisting of a solid compressed mixture of bituminous coal, asbestos, and a binder, the coal being finely divided and substantially uniformly distributed throughout the wearing portion of the block.

4. A friction block for brakes consisting of a solid compressed mixture of bituminous coal, asbestos, and linseed oil, the coal being finely divided and uniformly distributed throughout the wearing portion of the block.

5. The herein described method in the art of braking which consists in incorporating in the braking member a material which will become plastic and liberate gases under heat, frictionally generating the heat necessary to render said material plastic and to liberate gases therefrom by pressing the braking member into contact with the member to be braked, and condensing the liberated gases at the contacting surfaces of said members.

6. The herein described method in the art of braking which consists in incorporating in the braking member pyrobituminous material which will become plastic and liberate gases under heat, frictionally generating the heat necessary to render said pyrobituminous material plastic and to liberate gases therefrom by pressing the braking member into contact with the member to be braked, and condensing the liberated gases at the contacting surfaces of said members.

7. The herein described method in the art of braking which consists in incorporating coal in the braking member, frictionally generating heat necessary to render said coal plastic and to liberate gases therefrom by pressing the braking member into contact with the member to be braked, and condensing the liberated gases at the contacting surfaces of said members.

8. The herein described method in the art of braking which consists in incorporating bituminous coal in the braking member, frictionally generating heat necessary to render said bituminous coal plastic and to liberate gases therefrom by pressing the braking member into contact with the member to be braked, and condensing the liberated gases at the contacting surfaces of said members.

9. The herein described method in the art of braking which consists in forming a composition braking member having a finely divided pyrobituminous material uniformly distributed throughout the wearing portion thereof, frictionally generating the heat necessary to render said material plastic and to liberate gases therefrom by pressing the braking member into contact with the member to be braked, and condensing the liberated gases at the contacting surfaces of said members.

10. The herein described method in the art of braking which consists in forming a braking member composed of asbestos, coal and a binder, the coal being finely divided and uniformly distributed throughout the wearing portion of the braking member, frictionally generating the heat necessary to render said coal plastic and to liberate gases therefrom by pressing the braking member into contact with the member to be braked, and condensing the liberated gases at the contacting surfaces of said members.

11. The herein described method in the art of braking which consists in forming a braking member composed of asbestos, bituminous coal and a binder, the bituminous coal being finely divided and uniformly distributed throughout the wearing portion of the braking member, frictionally generating the heat necessary to render said bituminous coal plastic and to liberate gases therefrom by pressing the braking member into contact with the member to be braked, and condensing the liberated gases at the contacting surfaces of said members.

JAMES S. THOMPSON.